United States Patent
Kim

(10) Patent No.: US 11,453,381 B2
(45) Date of Patent: Sep. 27, 2022

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Jinyong Kim, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 264 days.

(21) Appl. No.: 16/656,111

(22) Filed: Oct. 17, 2019

(65) Prior Publication Data

US 2021/0001834 A1   Jan. 7, 2021

(30) Foreign Application Priority Data

Jul. 5, 2019 (KR) .................. 10-2019-0081394

(51) Int. Cl.
| | |
|---|---|
| *B60W 20/14* | (2016.01) |
| *B60L 7/26* | (2006.01) |
| *B60W 40/076* | (2012.01) |
| *B60L 53/62* | (2019.01) |
| *B60W 30/18* | (2012.01) |

(52) U.S. Cl.
CPC .............. *B60W 20/14* (2016.01); *B60L 7/26* (2013.01); *B60L 53/62* (2019.02); *B60W 30/18136* (2013.01); *B60W 40/076* (2013.01)

(58) Field of Classification Search
CPC ..... B60W 40/076; B60W 20/12; B60W 20/14
See application file for complete search history.

(56) References Cited

U.S. PATENT DOCUMENTS

| | | | |
|---|---|---|---|
| 2013/0015860 A1* | 1/2013 | Crombez .............. | H01M 10/44 324/433 |
| 2015/0097512 A1* | 4/2015 | Li ........................... | B60L 58/13 320/101 |
| 2018/0111496 A1* | 4/2018 | Cholewa ................. | B60L 58/15 |
| 2020/0161874 A1* | 5/2020 | Ito .............................. | B60L 7/16 |

FOREIGN PATENT DOCUMENTS

KR   10-2017-0138838 A   12/2017

* cited by examiner

*Primary Examiner* — Imran K Mustafa
(74) *Attorney, Agent, or Firm* — Slater Matsil, LLP

(57) ABSTRACT

A vehicle and a method for controlling the vehicle are provided. The vehicle may include a battery; and a motor configured to generate a driving force by using the electric power charged in the battery, perform a regenerative braking, and charge the battery through the regenerative braking. The vehicle identifies destination information entered in the input during the preparation of charging at the charging station, searches for a route from the charging station to the destination based on the position information of the charging station and the position information of the destination, acquires the charging amount by regenerative braking based on the road information in the searched route and the table, and stops controlling the charging of the battery when the charging amount charged in the battery is charged by the regenerative braking during charging of the battery at the charging station.

20 Claims, 12 Drawing Sheets

FIG. 3A

| INCLINATION / SPEED | AVERAGE INCLINATION 8~4% | AVERAGE INCLINATION 4~0% | AVERAGE INCLINATION 0~-4% | AVERAGE INCLINATION -4~-8% | AVERAGE INCLINATION -8~-12% | AVERAGE INCLINATION -12%~ |
|---|---|---|---|---|---|---|
| 30 | SOC -2% | SOC -1% | SOC 1% | SOC 2% | SOC 3% | SOC 3% |
| 40 | SOC X% | SOC X% | SOC X% | SOC X% | SOC X% | SOC X% |
| 50 | SOC X% | SOC X% | SOC X% | SOC X% | SOC 2.4% | SOC X% |
| 60 | SOC X% | SOC X% | SOC 0.8% | SOC X% | SOC X% | SOC X% |
| 70 | SOC X% | SOC X% | SOC X% | SOC X% | SOC X% | SOC X% |
| 80 | SOC X% | SOC X% | SOC X% | SOC X% | SOC 1.6% | SOC 2.1% |
| 90 | SOC X% | SOC X% | SOC X% | SOC X% | SOC X% | SOC X% |
| 100~ | SOC X% | SOC X% | SOC 0.7% | SOC 1.4% | SOC X% | SOC X% |

FIG. 3B

| INCLINATION<br>SPEED | AVERAGE<br>INCLINATION<br>8~4% | AVERAGE<br>INCLINATION<br>4~0% | AVERAGE<br>INCLINATION<br>0~-4% | AVERAGE<br>INCLINATION<br>-4~-8% | AVERAGE<br>INCLINATION<br>-8~-12% | AVERAGE<br>INCLINATION<br>-12%~ |
|---|---|---|---|---|---|---|
| 30 | SOC -2% | SOC -1% | SOC 1% | SOC 2% | SOC 3% | SOC 3% |
| 40 | SOC X% | SOC X% | SOC X% | SOC X% | SOC X% | SOC X% |
| 50 | SOC X% | SOC X% | SOC X% | SOC X% | SOC X% | SOC X% |
| 60 | SOC X% | SOC X% | SOC X% | SOC X% | SOC X% | SOC X% |
| 70 | SOC X% | SOC X% | SOC X% | SOC X% | SOC X% | SOC X% |
| 80 | SOC X% | SOC X% | SOC X% | SOC X% | SOC X% | SOC X% |
| 90 | SOC X% | SOC X% | SOC X% | SOC X% | SOC X% | SOC X% |
| 100~ | SOC X% | SOC X% | SOC X% | SOC X% | SOC X% | SOC X% |

FIG. 3C

| INCLINATION SPEED | AVERAGE INCLINATION 8~4% | AVERAGE INCLINATION 4~0% | AVERAGE INCLINATION 0~-4% | AVERAGE INCLINATION -4~-8% | AVERAGE INCLINATION -8~-12% | AVERAGE INCLINATION -12%~ |
|---|---|---|---|---|---|---|
| 30 | SOC -2% | SOC -1% | SOC 1% | SOC 2% | SOC 3% | SOC 3% |
| 40 | SOC X% | SOC X% | SOC X% | SOC X% | SOC X% | SOC X% |
| 50 | SOC X% | SOC X% | SOC X% | SOC X% | SOC X% | SOC X% |
| 60 | SOC X% | SOC X% | SOC X% | SOC X% | SOC X% | SOC X% |
| 70 | SOC X% | SOC X% | SOC X% | SOC X% | SOC X% | SOC X% |
| 80 | SOC X% | SOC X% | SOC X% | SOC X% | SOC X% | SOC X% |
| 90 | SOC X% | SOC X% | SOC X% | SOC X% | SOC X% | SOC X% |
| 100~ | SOC X% | SOC X% | SOC X% | SOC X% | SOC X% | SOC X% |

FIG. 4

| INCLINATION / SPEED | AVERAGE INCLINATION 8~4% | AVERAGE INCLINATION 4~0% | AVERAGE INCLINATION 0~-4% | AVERAGE INCLINATION -4~-8% | AVERAGE INCLINATION -8~-12% | AVERAGE INCLINATION -12%~ |
|---|---|---|---|---|---|---|
| 30 | SOC -4% | SOC -1% | SOC 1% | SOC 2% | SOC 3% | SOC 3% |
| 40 | SOC -4% | SOC -1% | SOC 0.9% | SOC 1.9% | SOC 2.9% | SOC 2.9% |
| 50 | SOC -4% | SOC -1% | SOC 0.8% | SOC 1.8% | SOC 2.7% | SOC 2.8% |
| 60 | SOC -4% | SOC -1% | SOC 0.7% | SOC 1.7% | SOC 2.6% | SOC 2.7% |
| 70 | SOC -4% | SOC -1% | SOC 0.6% | SOC 1.6% | SOC 2.5% | SOC 2.6% |
| 80 | SOC -4% | SOC -1% | SOC 0.5% | SOC 1.5% | SOC 2.4% | SOC 2.5% |
| 90 | SOC -4% | SOC -1% | SOC 0.4% | SOC 1.4% | SOC 2.3% | SOC 2.4% |
| 100~ | SOC -4% | SOC -1% | SOC 0.3% | SOC 1.3% | SOC 2.2% | SOC 2.3% |

VEHICLE AND METHOD FOR CONTROLLING THE SAME

CROSS-REFERENCE TO RELATED APPLICATION

The present application claims priority to and the benefit of Korean Patent Application No. 10-2019-0081394, filed on Jul. 5, 2019, which is incorporated herein by reference in its entirety.

TECHNICAL FIELD

The present disclosure relates to a vehicle and a control method thereof for preventing the restriction of use of regenerative braking and the deterioration of performance.

BACKGROUND

The statements in this section merely provide background information related to the present disclosure and may not constitute prior art.

The vehicle includes an internal combustion engine vehicle (a general engine driven vehicle) that generates mechanical power by burning petroleum fuels, such as gasoline and light oil and drives using the mechanical power, and an eco-friendly vehicle that drives on electricity to enhance the fuel efficiency and reduce toxic gas emissions.

Here, the eco-friendly vehicle includes: an electric vehicle that includes a battery, serving as a rechargeable power unit, and a motor such that the motor is rotated using the electricity accumulated in the battery and the vehicle wheels are driven using the rotation of the motor; a hybrid vehicle that includes an engine, a battery, and a motor and drives by controlling the mechanical power of the engine and the electric power of the motor; and a hydrogen fuel cell vehicle.

The eco-friendly vehicle performs the electric vehicle (EV) mode using only the power of the motor during flat driving, climbing driving and acceleration driving, and performs regenerative braking mode to recover the braking energy and the inertial energy through the motor generating operation to charge the battery during braking, decelerating driving, driving on downhill road, and coasting by inertia.

Such an eco-friendly vehicle has a problem in that regenerative braking is not performed when the state of the battery is full while driving on downhill road.

SUMMARY

An aspect of the present disclosure is to provide a vehicle and a method of controlling the same, which when charging the battery at the charging station, acquires a charging amount by regenerative braking based on road information from a charging station to a destination, and controls the charging of the battery based on the acquired charging amount by regenerative braking.

Another aspect of the present disclosure is to provide a vehicle and a method of controlling the same, which when charging the battery at the charging station, acquires the charging amount by regenerative braking at each point where the steel sheet ends in the road information from the charging station to the destination, and controls the charging of a battery based on the maximum charging amount among the acquired charging amounts by regenerative braking.

Another aspect of the present disclosure is to provide a vehicle and a method of controlling the same, which in the manual mode, acquires the charging amount by regenerative braking based on the point of interest and the route information starting from the point of interest and controls the charging of the battery based on the acquired charging amount by regenerative braking, and which in the automatic mode, acquires the charging amount by regenerative braking based on the driving pattern information of the user and the road information, and controls the charging of the battery based on the acquired charging amount by the regenerative braking.

Therefore, it is an aspect of the present disclosure to provide a vehicle including: a battery; a motor configured to generate a driving force by using the electric power charged in the battery, perform regenerative braking, and charge the battery through regenerative braking; a storage configured to store road information on the inclination of each position of the road and store information on the charging amount regenerative braking according to the inclination of the road as a table; a position receiver configured to receive information of current position; an input configured to receive information of a destination and user input; and a controller configured to search for a route from the charging station to the destination based on the position information of the charging station and the position information of the destination during the preparation of charging at the charging station, identify the inclination of the road in the searched route based on the road information stored in the storage, acquire the charging amount by regenerative braking based on the identified inclination of the road and the information of the table, and control the charging of the battery based on the acquired charging amount by the regenerative braking.

The storage of the vehicle stores a table for each type of road, and the controller identifies the type of the road in the searched route and acquires the charging amount of by regenerative braking corresponding to the identified type of road based on the information of the table.

The storage of the vehicle stores a table for each driving speed, and the controller identifies the driving speed of the road in the searched route and acquires the charging amount by regenerative braking corresponding to the identified driving speed of the road based on the information of the table for each driving speed.

The vehicle further includes an inclination detector configured to detect an inclination of the road; and a speed detector configured to detect a driving speed, wherein the controller identifies the charging amount of the battery generated when the regenerative braking is performed during driving in the automatic mode, and controls to store the identified charging amount in the cell in which the detected inclination of the road and the detected driving speed among the stored table are matched.

The vehicle further includes a speed detecting unit configured to detect a driving speed, and wherein the controller identifies the inclination of the road corresponding to the current position information received from the position receiver based on the road information stored in the storage while driving in the automatic mode, identifies the charging amount of the battery generated when performing the regenerative braking, and controls to store the identified charging amount in the cell in which the identified inclination of the road and the detected driving speed among the stored table are matched.

The vehicle further includes a first detector detecting a pressure applied to an accelerator pedal; and a second detector detecting a pressure applied to the brake pedal, and the controller acquires the driving pattern of the user for each inclination of the road based on the driving speed and the information of the pressure detected by the first and second detector s when performing the regenerative braking and controls to store the charging amount of the battery generated by the regenerative braking and the driving pattern of the user according to the inclination of the road.

The controller, when a point of interest, a position of the road adjacent to the point of interest and a charging limit amount are received through the input during the manual mode, controls the storage to store the received point of interest, a position information of a road adjacent to the point of interest, and the charge limit amount.

The controller, when a point of interest and a position of the road adjacent to the point of interest are received through the input during the manual mode, identifies the inclination of the road adjacent to the point of interest based on the information of the road stored in the storage, identifies the charging amount by regenerative braking corresponding to the identified inclination, and controls to display the identified charging amount as the recommended charging limit amount.

When the charging station performs charging of the battery, the controller controls the charging of the battery based on the stored charging limit amount if it is determined that the charging station is the point of interest, and controls charging based on the reference charging limit amount the controller, if it is determined that the charging station is not the point of interest.

The controller identifies the altitude of the road adjacent to the charging station, and controls the charging limit of the battery not to be performed if the distance corresponding to the difference between the altitude of the charging station and the identified altitude of the adjacent road is less than or equal to the preset distance.

The controller acquires the charging amount by regenerative braking based on the information of the roads in the searched route and the information of the table, identifies charging amounts by regenerative braking on the downhill road among the roads in the searched route, and controls the charging of the battery based on the maximum charging amount among the identified charging amounts by regenerative braking.

According to another aspect of a method for controlling a vehicle for generating a driving force by using a battery and electric power charged in the battery, performing regenerative braking and allowing the battery to be charged through regenerative braking, comprising: identifying information of a destination inputted to an input during charging preparation at a charging station, searching for a route from the charging station to the destination based on the position information of the charging station and the position information of the destination, acquiring the charging amount to be charged by regenerative braking based on the information of a road in the searched route and the information in the table stored in the storage, and controlling charging the battery based on the acquired charging amount during charging of the battery at the charging station.

The road information includes at least one of a position of the road, a type of the road, an inclination of the road, and a road speed limit, and table has information stored in the amount of charge by regenerative braking in which the driving speed and the inclination of the road match for each type of road.

The method for controlling the vehicle includes determining whether regenerative braking is performed, identifying the charging amount generated by regenerative braking when regenerative braking is performed, detecting the inclination of the road, detecting the driving speed, and controlling to store the charging amount of the battery in a cell in which the detected inclination of the road and the detected driving speed among the stored table are matched.

The method for controlling the vehicle further includes detecting the pressure applied to the accelerator pedal when regenerative braking is performed, detecting the pressure applied to the brake pedal, and acquiring and storing a driving pattern of the user for each inclination of the road based on the pressure information and the driving speed detected by the first detector and the second detector.

The method for controlling the vehicle further includes storing the received point of interest, the position of the road and the charging limit as information to be used in the manual mode when the point of interest, the position of the road adjacent to the point of interest and the charging limit amount are received through the input.

The method for controlling the vehicle further includes when the charging station performs charging of the battery, controlling charging of the battery based on the stored charging limit amount if it is determined that the charging station is the point of interest, and controlling the charging based on the reference charging limit amount if it is determined that the charging station is not a point of interest.

The method for controlling the vehicle further includes identifying an inclination of the road corresponding to the position of the received road when the point of interest and the position of the road adjacent to the point of interest are received through the input, and storing the charging amount by regenerative braking corresponding to the identified inclination together with the position of the road.

The method for controlling the vehicle further includes identifying the altitude of the road adjacent to the charging station, and controlling the charging limit of the battery not to be performed if the distance corresponding to the difference between the altitude of the charging station and the identified altitude of the adjacent road is less than or equal to the preset distance.

The method for controlling the vehicle further includes acquiring the charging amount by regenerative braking based on the information of the road in the searched route and the information of the table, identifying the charging amounts by regenerative braking on the downhill road among the roads in the searched route, and controlling the charging of the battery based on the maximum charging amount among the identified regenerative braking amounts.

The present disclosure can reduce the deterioration of braking performance by limiting the auxiliary braking force during driving on downhill road after charging, when the commercial vehicle is charged at the charging station of the high land, thereby reducing the risk of an accident.

The present disclosure acquires the charging amount by the regenerative braking based on the information on the driving pattern (i.e. driver's driving habits) of the user for each inclination of the road, and thus can efficiently charge by reflecting the characteristics of the individual by limiting the charging amount in the charging station.

The present disclosure can reduce the stopping of regenerative braking by increasing the charging amount by regenerative braking in a route having many downhill road sections, and maximizing the remaining charge of the battery upon arrival at the destination, can prevent the deterioration of the regenerative braking performance and can maximize the remaining charging amount of the battery upon arrival at the destination. This can reduce the charging time and the charging cost at the charging station.

In particular, it is possible to reduce the deterioration of the braking performance by limiting the auxiliary braking force during driving on downhill road after charging, when the commercial vehicle is charged at the charging station of the high land, thereby reducing the risk of an accident.

The present disclosure can directly set the limit for the charging station and the route desired by the user, thereby improving the user's satisfaction.

The present disclosure can improve the merchandise of an eco-friendly vehicle such as an electric vehicle and a plug-in hybrid electric vehicle (PHEV), and further secure the competitiveness of the product.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 3A, 3B, 3C are exemplary views of a table stored in a vehicle in one form of the present disclosure.

FIG. 4 is an exemplary diagram illustrating a charging route stored in a vehicle in one form of the present disclosure.

Figure 1:
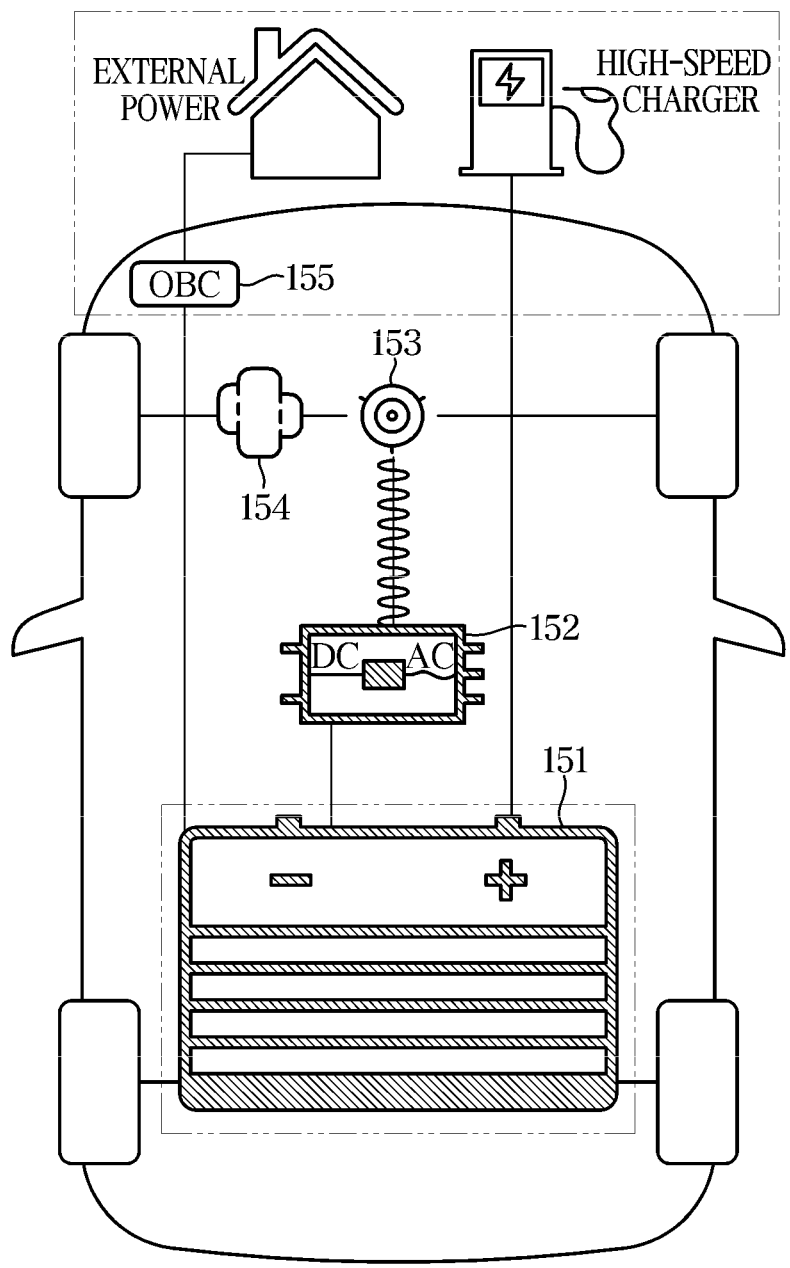
FIG. 1 is an exemplary view of a chassis of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all forms of the present disclosure will be described, and description of what are commonly known in the art or what overlap each other in some forms of the present disclosure will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

The vehicle may be an electric vehicle (EV) or a plugin hybrid electric vehicle (PHEV).

The vehicle may be a passenger vehicle used for personal use and for movement, or a commercial vehicle used for commercial use and for the transport of goods or people.

The commercial vehicle may include a truck, a dump truck, a van, a forklift truck, a special work vehicle for transporting goods, and may include a bus and a taxi for transporting people. Such a commercial vehicle may be heavier than a passenger vehicle, and thus, generation and supply of auxiliary braking force may be more important than a passenger vehicle when driving on downhill road.

In some forms of the present disclosure, it may be an electric commercial vehicle (hereinafter, referred to as a vehicle).

The vehicle 1 may include a body having an interior and an exterior, and a chassis installed with a mechanical device required for driving to the remaining parts except the body.

The chassis of the vehicle is a frame for supporting the body, and the chassis may be provided with wheels arranged in front, rear, left, and right sides, a power unit for applying driving force to the front, rear, left, and right wheels, a steering device, a braking device for applying a braking force to the front, rear, left, and right wheels, and a suspension device.

The power unit may include a battery, a speed reducer, a motor, and an axle.

The vehicle 1 may include an accelerator pedal that is pressed by the user in accordance with the accelerate will of the user, a brake pedal that is pressed by the user in accordance with the braking will of the user, and a steering wheel of a steering device for adjusting the driving direction.

As shown in FIG. 1, the vehicle chassis includes a battery 151, a power converter 152, a motor 153, a speed reducer 154, and an on-board charger 155.

The battery 151 may represent a main battery that generates high-voltage current to supply a driving force to the vehicle.

The battery 151 may be electrically connected to electronic devices such as convenience devices and additional devices to supply driving power to the electronic devices.

The battery may be charged with power supplied from a charger placed in a parking lot or charging station. That is, the battery 151 may be a battery that can be charged and discharged.

When regenerative braking of the battery 151, the battery 151 may be charged using power generated by a motor that performs a power generation function.

The vehicle may further include an auxiliary battery provided separately from the battery 151.

The auxiliary battery may supply power to electronic devices such as convenience devices and additional devices such as a terminal 140, a lamp, a black box, and the like. The output voltage of the main battery may be the same as the output voltage of the auxiliary battery or may be higher than the output voltage of the auxiliary battery.

The auxiliary battery may be charged using power charged in the main battery.

The battery 151 may be managed by the battery manager. The battery manager will be described later.

The power converter 152 converts the power supplied from the outside into power for charging the battery 151 and supplies the converted power to the battery 151. The power supplied from outside may be power of a charging station.

The power converter 152 may convert the power of the battery 151 to supply the power charged in the battery 151 to the auxiliary battery. The power converter 152 may include a low voltage direct current converter (LDC).

The power converter 152 may also perform a function of changing the direction and output of the current between the motor 153 and the battery 151.

The motor 153 may generate a rotational force by using the electrical energy of the battery 151 and transmit the generated rotational force to the wheels to drive the wheels.

The motor 153 converts electrical energy of the battery 151 into mechanical energy for operating various devices provided in the vehicle.

The motor 153 is supplied with the maximum current when the boot button is turned on to generate the maximum torque.

The motor 153 may be operated as a generator in an energy regeneration condition by braking, deceleration, driving on downhill road, or low speed driving so that the battery 151 may be charged.

The speed reducer 154 reduces the speed of the motor and transmits the rotating force which increased the torque of the motor to a wheel.

The vehicle may further include a charging unit provided at an exterior of the body, connected to a charging cable and receiving power for charging the battery.

The charging unit may include a high-speed charging unit for high-speed charging the battery, and a slow charging unit for slowly charging the battery at a slower speed than the high-speed charging speed.

A cable for high-speed charging may be connected to the high-speed charging unit, and a cable for slow charging may be connected to the slow charging unit.

In addition, the high-speed charging unit for high-speed charging and the slow charging unit for slow charging slower than the high-speed charging may be provided at the same position of the exterior of the vehicle or may be provided at different positions.

The on-board charger 155 converts external commercial power (AC) into rectification and direct current, and transfers them to the battery 151. For example, the on-board charger 155 may include an AC rectifier, a power factor correction (PFC), a converter, and a capacitor.

The high-speed charging unit may include at least one of a terminal and a cable for directly connecting an external high-speed charger and the battery 151.

Figure 2:
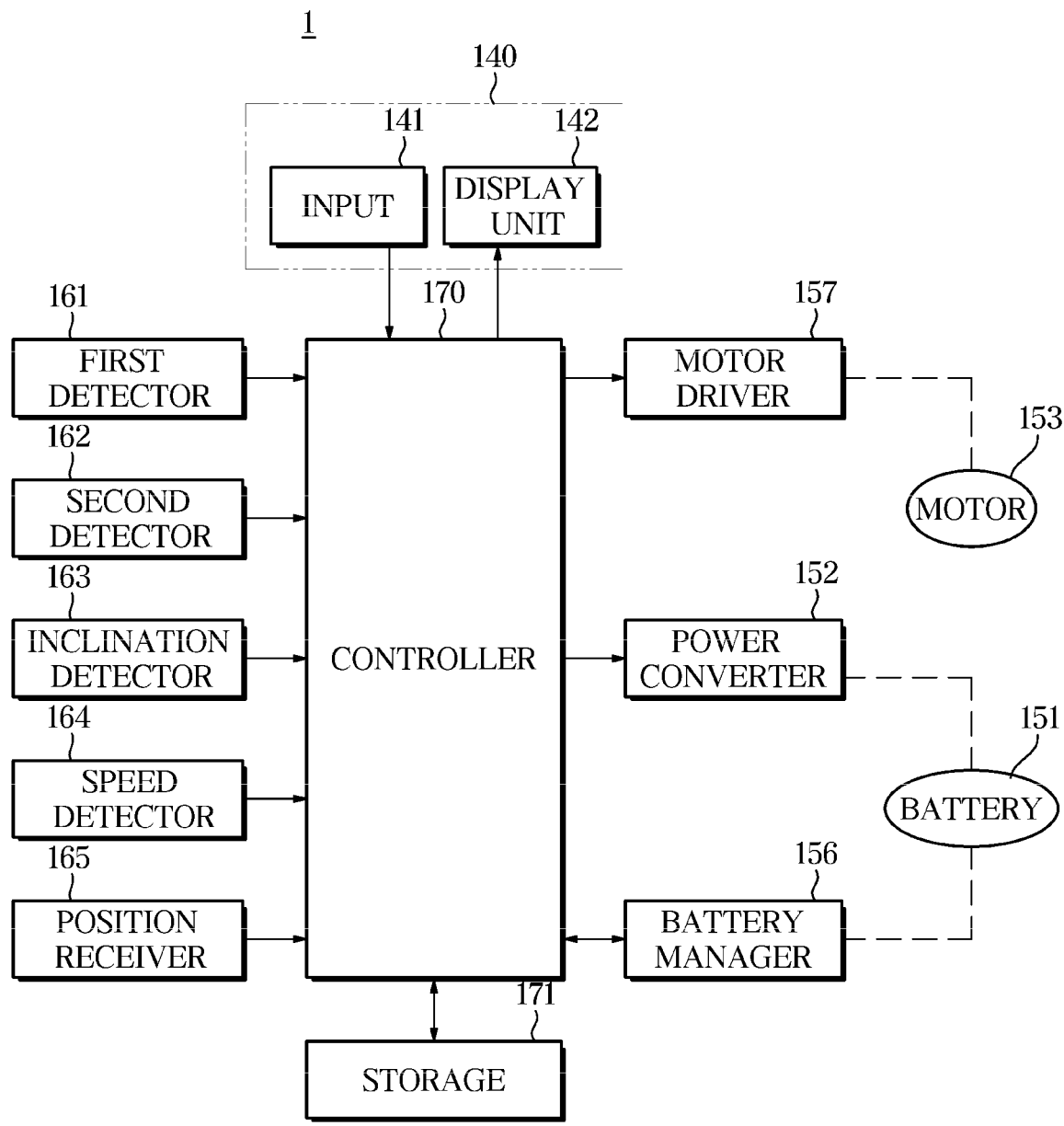
FIG. 2 is a control block diagram of a vehicle in one form of the present disclosure.

FIG. 2 is a control block diagram of a vehicle in some forms of the present disclosure.

The vehicle 1 includes a terminal 140, a battery 151, a motor 153, a power converter 152, a battery manager 156, a motor driver 157, a first detector 161, and a second detector 162, an inclination detector 163, a speed detector 164, a position receiver 165, a controller 170, and a storage 171.

The terminal 140 is a terminal for the vehicle provided inside the vehicle and displays an image for at least one function selected by a user among an audio function, a video function, a navigation function, a broadcasting function (DMB function), a radio function, a content playback function, and an internet search function.

As such, the terminal 140 may include an input 141 and a display unit 142.

The input 141 receives an on-off command of at least one function from among a plurality of functions, and receives an operation command for the input at least one function. For example, the input 141 may receive at least one execution command of a radio function, an audio function, a video function, a map display function, a navigation function, a DMB function, a content playback function, and an internet search function.

The input 141 may receive destination information from a user when selecting a navigation mode for performing a navigation function.

The input 141 may receive an operation command of a manual mode and an automatic mode for charging limitation.

The input 141 receives the information of the point of interest set by the user from the information of the at least one charging station.

The input 141 may receive route information starting from a point of interest, and may receive a limit amount during battery charging.

The display unit 142 displays operation information on the performing function.

For example, the display unit 142 may display information related to a phone call, or display information of content output through the terminal 140, or display information related to music playback and display external broadcast information.

When the navigation mode is performed, the display unit 142 displays a route from the current position to the destination and displays road guidance information.

The display unit 142 may display guide information on the setting of the point of interest in the manual mode, and may display guide information for setting the charging limit amount.

The display unit 142 displays the inclination of the downhill road and the charging amount charged during a certain distance driving as a table. This may be used as a reference guide when a user sets a point of interest.

The display unit 142 displays charge state information of the battery 151. The charging state information may include a charging amount of the battery and a charge level corresponding to the charging amount of the battery.

The power converter 152 converts the power supplied from the outside into power for charging the battery and transfers the converted power to the battery.

The power converter 152 converts the power of the battery into power for driving various electronic devices, or converts the power of the battery into power for charging the auxiliary battery.

When at least one switch element is provided, the power converter 152 may perform power conversion by performing an on or off operation in response to a control command of the controller 170. Here, the power conversion may include conversion of DC to AC, conversion of AC to DC, conversion of magnitude of DC, and conversion of magnitude of AC.

The battery manager 156 may monitor the charging state of the battery 151, transmits charging state information on the monitored charging state to the controller 170, and identify the charging level corresponding to the charging state of the battery 151.

The battery manager 156 includes a detector (not shown) for detecting a state of charge of the battery 151.

The detector (not shown) may include a current detector configured to detect a current of the battery, and may optionally further include a voltage detector for detecting a voltage at both ends of the battery and a temperature detector for detecting the temperature of the battery.

The battery manager 156 monitors the state of charge of the battery based on the detected current of the battery. The battery manager 156 may monitor the state of charge of the battery based on the detected current and voltage of the battery. The battery manager 156 may monitor the state of charge (SOC) of the battery based on the current, voltage, and temperature of each cell of the battery.

The battery manager 156 outputs charge state information on the monitored state of the battery to the controller 170.

Here, the state of charge of the battery 151 may include the charging amount of the battery.

The battery manager 156 may store a charge level corresponding to the charging amount of the battery 151, and may store a charge level corresponding to the current of the battery.

The battery manager 156 may acquire a charging amount of the battery corresponding to the current, voltage, and temperature of the battery from a pre-stored table. Here, the pre-stored table may match the charging amount of the battery corresponding to the correlation of the current, voltage and temperature of the battery.

The battery manager 156 periodically identifies the charging state of the battery 151 and outputs the charging state information on the identified charging state of the battery to the controller 170.

The motor driver 157 drives the motor 153 in response to a control command of the controller. The motor driver 157 may include an inverter configured to convert the power of the battery 151 into the driving power of the motor 153.

When the drive power output of the motor 153 is output, the inverter outputs the driving power of the motor 153 based on the target vehicle speed by a user command. The driving power of the motor 153 may be a switching signal for outputting a current corresponding to the target vehicle speed and a switching signal for outputting a voltage corresponding to the target vehicle speed. That is, the inverter may include a plurality of switching elements.

The inverter may transfer power generated by the motor 153 to the battery 151 during regenerative braking.

The vehicle may include first and second detectors 161 and 162 for detecting a driving intention of a user, an inclination detector 163 for detecting an inclination of a road, and a speed detector 164 for detecting a driving speed of the vehicle.

The first detector 161 detects the pressure applied to the accelerator pedal.

The second detector 162 detects the pressure applied to the brake pedal.

The inclination detector 163 detects the inclination of the road.

The inclination detector 163 may be an acceleration sensor or may include at least one of a gyro sensor, an angular velocity sensor, and a gravity sensor. The inclination information of the road may be navigation information and ADAS map information. Accordingly, the inclination detector can be omitted.

The speed detector 164 detects a driving speed of the vehicle.

The speed detector 164 may include a wheel speed sensor provided on each of the front, rear, left, and right wheels to detect the rotational speed of each wheel, and may include an acceleration detector to detect the acceleration of the vehicle.

The vehicle may further include a position receiver 165 for receiving position information on the current position. Here, the position receiver 165 includes a GPS receiver (not shown), and transmits information on the current position of the vehicle to the controller 170.

When the navigation mode is selected by the input 141 and the destination information is received, the controller 170 identifies the current position, searches for a route from the current position to the destination based on the identified current position information and the destination information, and controls the display unit 142 to display the searched route.

The controller 170 receives the charging state information on the state of charge of the battery from the battery manager 156 before performing the charging and controls the controller 170 to output the received battery state information through the display unit 142.

The controller 170 determines whether to charge the battery based on the charging amount and the reference charging amount corresponding to the received charge state information, and if it is determined that the battery needs to be charged, the controller 170 controls to output the charge request information through the display unit 142.

Here, the state of change (SOC) information of the battery may include the charging amount of the battery.

When the charging station search command is input to the vehicle terminal 140, the controller 170 may search for a charging station existing within a predetermined distance from the position of the vehicle based on the current position information of the vehicle 1 and the position information of the charging station stored in the storage.

In addition, the controller 170 may search for a charging station existing within a predetermined distance from the position of the vehicle based on the position information of the charging station provided by the server (not shown).

The controller 170 identifies the position information of the found charging station and searches for a route from the current position to the charging station based on the identified position information of the charging station and the current position information and guides the way to the searched route.

If there is no driving history of the vehicle, that is, the controller 170 controls the display unit 142 to output the guide information on the charging limit amount setting when the vehicle is first driven.

The controller 170 controls the display unit 142 to display the inclination of the downhill road pre-stored and a table (that is, the first table) of the charging amount by regenerative braking. Here, the charging amount by regenerative braking may be a charging amount of a battery charged by regenerative braking when driving a certain distance from the downhill road.

The controller 170 controls the storage of the input charging limit amount when the charging limit amount of the battery is input through the input 141, and controls the charging the battery based on the stored charging limit amount when the charging of the battery is performed during the manual mode.

For example, when the charging amount of 15% by regenerative braking is input by the user, the controller 170 stops the charging of the battery when the charging amount of the battery is 85% (100%-15%) which is the charging allowance amount, while the charging is performed.

The controller 170 may control the display unit to output the input request information of the charging limit amount when arriving at the charging station during the manual mode, and store the charging limit amount input to the input.

The controller 170, when arriving at the charging station during the manual mode, may control the display unit to output the charging limit amount recommendation information based on road information adjacent to the charging station, and store the charging limit amount input to the input.

Here, the charging limit amount recommendation information may be information on the charging amount by regenerative braking corresponding to the inclination and the speed limit of the road adjacent to the charging station.

The controller 170 may control the charging of the battery based on the reference charging limit when the battery is charged while the charging limit amount of the battery is not input through the input 141 in the manual mode.

The controller 170 may display an inclination and a first table for each road of a road adjacent to the point of interest (that is, the charging station) set by the user, and when the charging amount is input by the user, the controller 170 may control the storage to store the input charging amount as the charging limit amount at the displayed point of interest. In this case, the user may input the charging amount after identifying the first table of the charging amount by the regenerative braking displayed on the display unit.

The controller 170 may identify the information of the point of interest set by the user and the route information starting from the point of interest, may identify the charging amount by regenerative braking corresponding to the inclination of the road in the identified route information, and may store the identified charging amount by regenerative braking together with the set point of interest.

The controller 170 may display the identified charging amount by regenerative braking together with the information of the point of interest set by the user. When starting from the point of interest set by the user, t selection of the user may be facilitated by displaying the charging amount by regenerative braking for each road adjacent to the point of interest as the recommended limit amount The controller 170 may identify the position of the current charging station when the charging of the battery is performed during the manual mode, may identify route information starting from the point of interest when the identified position of the current charging station is a stored point of interest, may identifies the charging limit amount corresponding to the identified route information and the stored point of interest, may control the charging of the battery based on the identified charging limit amount, and may control the charging of the battery based on the reference charging limit amount if the identified position of the current charging station is not the point of interest.

The controller 170 may store point of interest (i.e. charging station) and charging limit amount for each of the plurality of users as information, may recognize the user when performing the charging, and may control the charging of the battery based on the identified point of interest and charging limit amount after identifying the point of interest and the charging limit amount of the recognized user.

The user recognition may include recognizing a user using input information, face recognition information using a camera, fingerprint information using a fingerprint, iris information using an iris, voice information using a voice, etc. through an input.

The controller 170 identifies the information of the road and the charging amount by regenerative braking while driving and stores the identified information of the road and the identified information of the charging amount by regenerative braking. Here, the information of the road may include the inclination of the road and the position information of the road.

The controller 170 identifies the charging amount by regenerative braking based on the position information of the charging station, the information of the road adjacent to the charging station, and the second table stored in the storage when charging at the charging station during the automatic mode, and controls the charging amount of the battery based on the identified charging amount of regenerative braking. Here, the second table has information about the charging amount by regenerative braking corresponding to the type of the road, the driving speed, and the inclination of the road.

The road information may include position information of the road, inclination of the road for each position, and speed limit of the road for each position.

The controller 170 may receive charge state information on the state of charge of the battery from the battery manager 156 while performing charging, may control to output the received battery state information through the display unit 142, may identify the current position, may search for a route from the current position to the destination based on the identified current position information and the destination information, may identify the information of the road in the searched route based on at least one of the navigation information and the ADAS map information, may acquire the charging amount by regenerative braking based on the identified road information and the identified second table, may acquire the charging allowance amount based on the acquire d charging amount by the regenerative braking, and may control the charging of the battery such that the charging amount of the battery reaches a charging allowance amount.

The charging amount by regenerative braking is the charging amount that can be charged by regenerative braking when driving on one link of a road adjacent to the charging station, which may be an expected value. One link means a road by a predetermined distance.

The information of the road identified here may include the position of the road, the type of the road, the inclination of the road, the speed limit of the road, and the traffic information. The vehicle may further include a communication unit and may receive traffic information from the current position to the destination through the communication unit.

The controller 170 performs an automatic mode, may identify the type of road and the inclination of the road while driving, acquires a driving pattern corresponding to the driving habits of the user, and controls the storage of the acquired driving pattern, the identified type of the road, and the inclination. The driving pattern herein may include a driving speed, pressure information of the accelerator pedal, and pressure information of the brake pedal. The pressure information of the accelerator pedal and the pressure information of the brake pedal may include the pressure magnitude of the brake pedal and the number of presses, and may include the pressure magnitude and the number of presses of the accelerator pedal.

The controller 170 may perform an automatic mode, may acquire pressure information of an accelerator pedal or a brake pedal from the first and second detectors 161 and 162 when the accelerator pedal is pressed by the user or the brake pedal is pressed while driving, may acquire the required power of the user based on the acquired pressure information and the speed information detected by the speed detector 164, may acquire a target driving speed of the vehicle corresponding to the acquired power of the user, may control the operation of at least one of the motor 153 and the reducer 154 based on the acquired target driving speed of the vehicle, and may identify the charging amount of the battery is charged by regenerative braking, and may store the information of the road together with the identified charging amount.

The controller 170 may control to store the driving pattern of the user, road information, and information on the charging amount by regenerative braking together.

More specifically, the controller 170 controls the performance of the EV mode that drives using the power of the motor 153, based on whether the target driving speed, braking, acceleration driving, decelerating driving, driving on downhill road, and climbing driving of the vehicle, or controls the performance of the regenerative braking mode of the motor 153.

The controller 170 may store the number of times of pressurization and pressure magnitude of the brake pedal and the accelerator pedal of the user corresponding to the position of the road, the type of the road, the driving speed, and the inclination of the road every time the vehicle drives a certain distance, may acquire the charging amount of the battery by regenerative braking when driving a certain distance and may further store the charging amount of the acquired battery.

The charging amount by regenerative braking=potential energy*efficiency+output energy*efficiency-braking energy.

The potential energy may be energy converted when driving on the downhill road at the charging point. The output energy may be energy output through the motor by the pressurization the accelerator pedal. The braking energy may be energy consumed through the main braking device (e.g. hydraulic braking device, etc.) by the pressurization of the brake pedal.

The charging amount SOC of the battery may be determined by the energy output through the motor by the pressurization of the accelerator pedal and the energy charged by the regenerative braking.

The charging amount of battery=initial charging amount of the battery−output energy+charging amount by regenerative braking.

The initial charging amount of the battery may be an amount of energy charged in the battery at startup.

The controller 170 identifies the information of the road and the driving speed acquired the charging amount by the regenerative braking for each link of the road, identifies a group having the identified road information and the driving speed among the groups of the second table, and stores the acquired charging amount in the identified group.

The information of the road identified here is information stored in the second table, and may include the type of road and the inclination of the road.

The driving speed may be an average driving speed on a road that drives while regenerative braking is performed.

The controller 170 may identify the type of the road and the inclination of the road based on at least one of the navigation information and the ADAS map information.

The controller 170 may identify the inclination of the road among the road information based on the detection information detected by the inclination detector 163.

The controller 170 may identify the driving speed based on the detection information detected by the speed detector 164.

For example, if the average driving speed acquired while driving a certain distance 500 m from the highway is 30 kph, the inclination of the road is −3% and the charging amount of the battery is 1%, the controller identifies the group having the average driving speed and the inclination of the road in the second table of the highway among the second tables and stores the identified charging amount by the regenerative braking in the identified group. That is, the controller stores 1% of the charging amount by regenerative braking, in a cell having an average driving speed of 30 kph and an inclination of the road range of 0 to −4% (see FIG. 3A).

The controller 170 updates the information of the second table stored in the storage based on the accumulated information when the information acquired due to a long driving distance is accumulated.

The controller 170 may store the charging amount by regenerative braking in the identified group but may accumulate and store the charging amount by regenerative braking previously acquired, may acquire the average charging amount by regenerative braking of the charging amount by regenerative braking stored in the identified group, and may store the acquired average charging amount by the regenerative braking as the representative charging amount of the group. In this case, the representative charging amount may be a cell value of the second table.

In addition, the controller may store the minimum charging amount among the charging amounts by the regenerative braking of the identified group as the representative charging amount of the identified group, and may store the maximum charging amount among the charging amounts by the regenerative braking stored in the identified group as the representative charge of the identified group.

Road links may be classified in correspondence with the inclination of the road. That is, the controller recognizes as another link when the inclination of the road changes.

The values of the cells of the second table may be charging amount by regenerative braking corresponding to the driving speed and the inclination of the road. Here, the driving speed may be an average driving speed on one link, and the inclination of the road may be divided into a predetermined range.

The values of the cells of the second table may be charging amount by regenerative braking for each range of the average travel speed and the inclination.

That is, the controller 170 may update the charging amount by regenerative braking of each cell of the second table every time a certain distance is driven, and when the cumulative stored distance of any one cell is greater than or equal to the reference distance, the controller 170 may delete the oldest charging amount among the charging amounts by regenerative braking of any one cell.

For example, when driving at a distance of 500 m at a speed of 30 kph on a highway with an average inclination of −4 to −8%, The controller 170 stores the charging amount by regenerative braking acquired while driving 500 m in a group having a speed of 30 kph and an average inclination range of −4 to −8% in the second table of the highway.

At this time, the storage accumulates and stores the charging amount by regenerative braking acquired from the past to the present in the group having the speed of 30 kph and the average inclination range of −4 to −8% in the second table of the highway. In this case, the cell value corresponding to the speed of 30 kph and the average inclination range of −4 to −8% of the second table may be an average charging amount with respect to the accumulated charging amounts by the regenerative braking.

When driving at a distance of 500 m at a speed of 30 kph on a highway with an average inclination range of −4 to −8%, if the total distance drived at a speed of 30 kph on a highway with an average inclination range of −4 to −8% is 5 km, the controller 170 may delete the oldest charging amount among the charging amounts by the regenerative braking in the group having the speed of 30 kph and the average inclination range of −4 to −8% in the second table of the highway, and may store the charging amount by regenerative braking acquired while driving 500 m in the corresponding group of the second table of the highway.

In this case, as a cell value corresponding to a speed of 30 kph and an average inclination range of −4 to −8% of the second table, the average charging amount with respect to the accumulated charging amounts of regenerative braking may be stored.

The controller 170 acquires the driving pattern of the user, the information of the road, the driving speed and the charging amount by regenerative braking while driving, and acquires values of all groups of the second table based on the acquired information. It is possible to set the values of all cells of (see FIG. 6).

Figure 6:
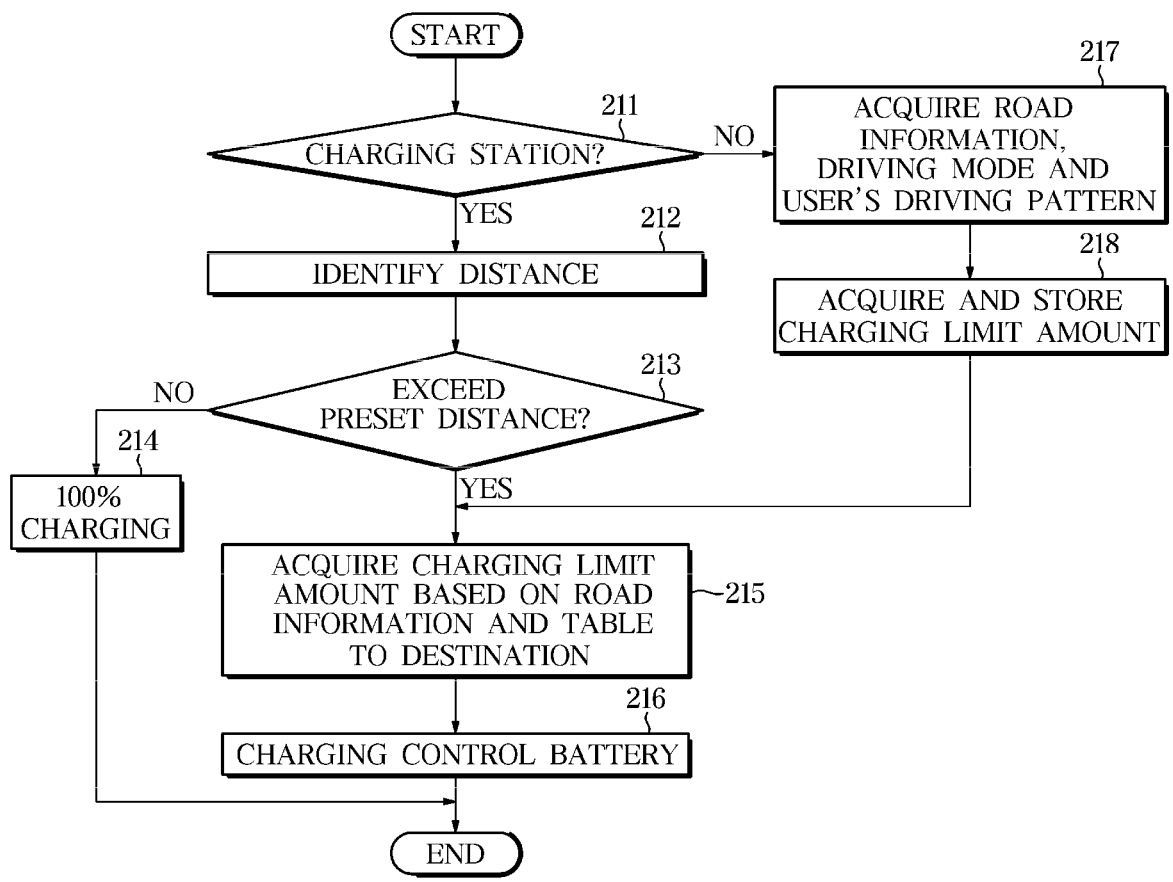
FIG. 6 is a control flowchart of the automatic mode of the vehicle in one form of the present disclosure.
Figure 7:
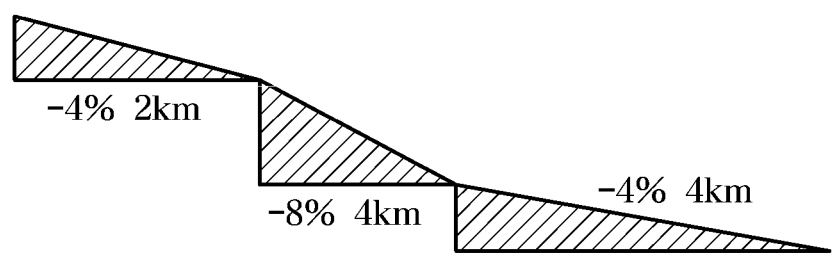
FIGS. 7, 8, 9 and 10 are exemplary diagrams of acquiring a charging amount by regenerative braking of a vehicle in one form of the present disclosure.
Figure 8:
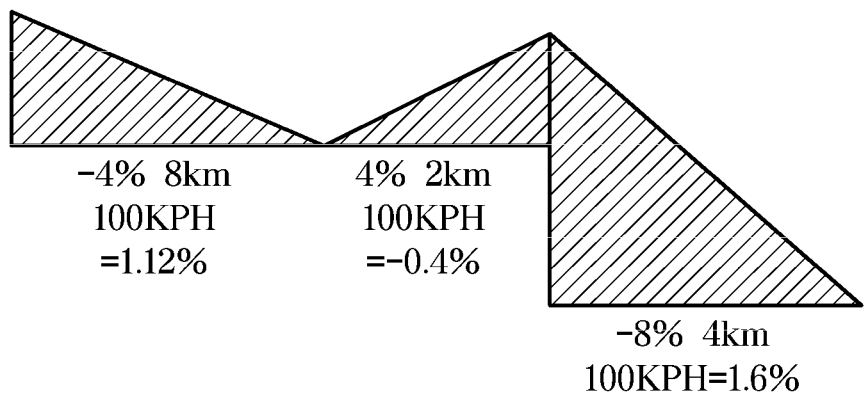

The controller 170 may acquire the driving pattern of the user, the information of the road, the driving speed and the charging amount by regenerative braking while driving, and may set values of all cells of the second table by acquiring values of all groups of the second table based on the acquired information (see FIG. 6).

The controller 170 may identify the type of road, the inclination of the road, the driving speed, and the charging amount by regenerative braking for each link even moving to the charging station, and may update the second table based on the type of road, the inclination of the road, the driving speed, and the charging amount by regenerative braking for each link identified.

The controller 170, when performing the regenerative braking mode, allows the power generation function to be performed in the motor. That is, the motor is operated as a generator. Operating the motor as a generator here includes controlling the switches of the inverter to operate on the same operating principle as the boost converter by counter electromotive force.

The controller 170 sets the torque value of the motor to a negative value for the braking control, but to a negative torque value corresponding to the reference regenerative braking amount, and controls the current to flow into the battery by making the current direction reverse to the current direction at the time of acceleration by setting the torque value to a negative value.

At this time, torque is generated in the opposite direction to perform regenerative braking.

That is, the controller 170 cuts off the power applied to the motor 153 and controls the direction of the torque applied to the motor 153 in the reverse direction so that the motor 153 operates as a generator, allows the motor 153 to operate as a generator by controlling the direction of the torque applied to the motor 153 in the reverse direction, and allows the battery to be charged by a motor operated by a generator.

At this time, the rotational direction of the motor is not changed by the inertia force.

As such, the controller 170 allows the motor to be operated as a generator by inertial energy and allows the battery to be charged by the motor that performs the power generation function.

The controller 170 may identify the charging amount by regenerative braking when charging the battery in the charging station based on the information of the road in the searched route and the information of the second table, and may control the charging of the battery based on the identified amount of regenerative braking.

The identified charging amount by the regenerative braking herein may be a charging amount that can be charged by regenerative braking when moved to a certain distance from the charging station.

The controller 170 may continuously update information of the second table while driving.

The controller 170, when the value of each cell of the second table (the charging amount by regenerative braking) is determined, may identify the points at which steel sheet driving ends based on the information of the road from the charging station to the destination, may acquire the charging amount by regenerative braking when driving to the identified points, and may control the charging of the battery based on the maximum value of the charging amount by the regenerative braking acquired.

It is also possible to acquire the charging amount by regenerative braking during driving and to control the charging of the battery based on the maximum value of the charging amount by regenerative braking acquired.

The controller 170, when the value of each cell of the second table (the charging amount by regenerative braking) is determined, may identify the points at which downhill driving ends based on the information of the road from the charging station to the destination, may acquire the charging amount by regenerative braking at the end point of the last downhill driving and may control the charging of the battery based on the acquired charging amount by the regenerative braking.

The controller 170 may control the charging of the battery based on the charging amount by regenerative braking corresponding to the number of shifts and the inclination of the road.

The controller 170 may be implemented as a memory (not shown) that stores data about an algorithm for controlling the operation of components in the vehicle or a program reproducing the algorithm, and a processor (not shown) that performs the above-described operation using data stored in the memory.

In this case, the memory and the processor may be implemented as separate chips.

Alternatively, the memory and the processor may be implemented in a single chip.

The storage 171 stores a reference charging amount for determining the need for charging the battery.

The storage 171 may also store a reference charging limit amount to be used in the manual mode.

The storage 171 stores the charging limit amount set by the user.

The storage 171 may also store guide information for setting the charging limit amount in the manual mode. The storage 171 stores the inclination of the downhill road and the charging limit amount as a table (first table). Here, the charging limit amount may be a charging amount of the battery that is charged when driving a certain distance on the downhill road. The first table may be information acquired by experiments and pre-stored.

The storage 171 may store a point of interest (POI) information selected by the user, and may store route information starting from the point of interest. Point of Interest (POI) may be a charging station or a point where charging is possible.

The storage 171 may also store the point of interest (POI) selected by the user and the charging limit amount together.

The storage 171 may also store the charging amount by regenerative braking corresponding to the number of shifts and the inclination of the road.

The storage 171 stores the charging amount by regenerative braking corresponding to the driving speed and the inclination of the road used in the automatic mode as a table (second table).

The charging amount by regenerative braking corresponding to the driving speed and the inclination of the road used in the automatic mode may be information reflecting a driving habit of the user.

In addition, the second table may be stored for each type of road.

As illustrated in FIGS. 3a, 3b, and 3c, the charging amount by regenerative braking reflecting the driver's driving pattern may be stored in the storage 171 for each type of the road.

For example, the storage 171 may store a second table (FIG. 3a) of the charging amount by regenerative braking corresponding to the driving speed and the inclination of the road on the highway, a second table (FIG. 3b) of the charging amount by regenerative braking corresponding to the driving speed and the inclination of the road in the general national road with few traffic lights, and a second table (FIG. 3c) of the charging amount by regenerative braking corresponding to the driving speed and the inclination of the road in the city roads, archipelagos, and local roads with many traffic lights.

The charging amount by regenerative braking corresponding to the driving speed and the inclination of the road stored in the storage 171 may be updated every predetermined distance driving, and if the accumulated distance stored in the storage 171 is greater than or equal to the reference distance, the oldest information may be deleted.

For example, when driving at a speed of 30 kph by a distance of 500 m on a highway with an average inclination of −4 to −8%, the charging amount acquired while driving 500 m is stored in the table of the speed of 30 kph and the average inclination of −4 to −8% in the highway table of the storage.

The charges acquired from the past to the present are accumulated and stored in the table of the speed 30 kph and the average inclination −4 to −8% in the highway table of the storage. In this case, the storage 171 may store an average value with respect to accumulated charging amount.

When driving by a distance of 500 m at a speed of 30 kph on a highway with an average inclination of −4 to −8%, if the total distance drived at a speed of 30 kph on the on a highway with an average inclination of −4 to −8% is 5 km, the oldest charging amount corresponding to the speed of 30 kph and the average inclination of −4 to −8% is deleted from the highway table in the storage, and the charging amount acquired while driving 500 m in a table of speed 30 kph and an average inclination of −4 to −8% is stored in the highway table of the storage.

As shown in FIG. 4, while performing the update, both the charging amount by regenerative braking corresponding to the driving speed and the average inclination range may be stored in the storage 171.

The storage 171 stores the pressure information of the accelerator pedal and the brake pedal corresponding to the user's driving habit for each link of the road.

The pressure information may include the number of times of applying pressure and the magnitude of the pressure.

The link of the road may be a section in which the vehicle performs the downhill road driving on the road.

The storage 171 may also store the position energy converted due to the downhill road driving, the output energy by pressurization of the accelerator pedal, the hydraulic braking energy by pressurization of the brake pedal, and the energy by regenerative braking.

The storage 171 may store at least one of the navigation information and the ADAS map information.

Navigation information includes map data, position of road, type of road, road curvature for each link of the road, inclination for each link of road, and road environment information of speed limit.

ADAS map information includes road environment details such as road curvature, inclination, speed limit, and branch point in the map data. The ADAS map information may be information 10 times higher in accuracy than the navigation information.

The storage 171 may be a memory implemented as a chip separate from the processor described above with respect to the controller 170, or may be implemented as a single chip with the processor.

The storage 171 may be implemented as at least one of a nonvolatile memory device such as a cache, a read only memory (ROM), a programmable ROM (PROM), an erasable programmable ROM (EPROM), an electrically erasable programmable ROM (EEPROM), and a flash memory, or a volatile memory device such as Random Access Memory (RAM), or a storage medium such as a hard disk drive (HDD) and a CD-ROM, but is not limited thereto.

Figure 5:
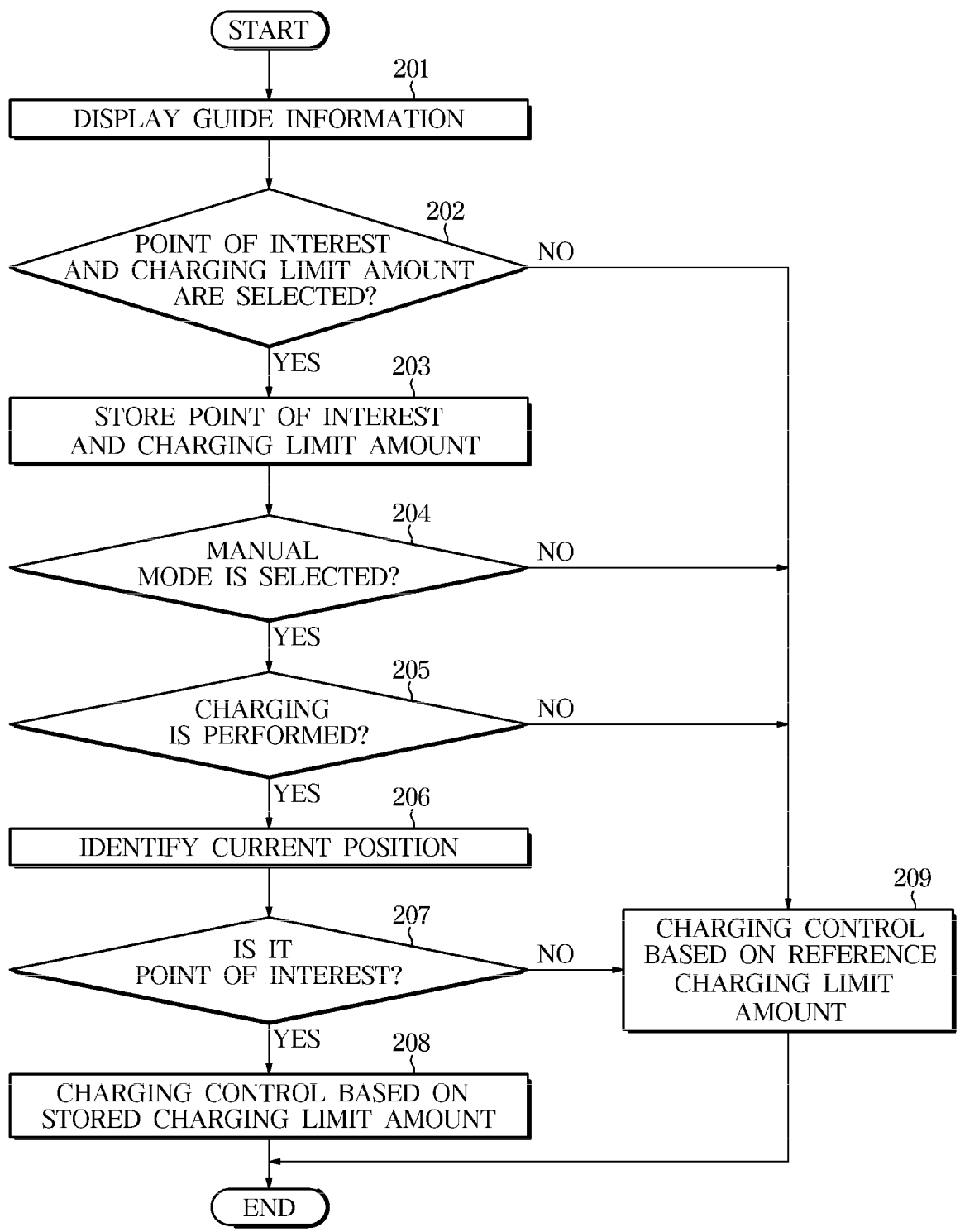
FIG. 5 is a control flowchart of a manual mode of a vehicle in one form of the present disclosure.

FIG. 5 is a control flowchart of a manual mode of a vehicle in some forms of the present disclosure.

If the vehicle does not have a driving history of the vehicle, the vehicle displays 201 the guide information on setting of the charging limit amount through the display unit 142. In addition, when the manual mode is selected by the user, the vehicle may display the guide information on the setting of the charging limit amount through the display unit 142.

The charging limit amount may be a charging amount limited when the battery is charged at the charging station.

Here, the guide information on setting the charging limit amount may be table information in which information about the inclination of the road and a charging amount of a battery that can be charged by the regenerative braking for each inclination are stored.

In addition, the guide information on setting the charging limit amount may be information indicating that a point for charging the battery is set as the point of interest, information indicating that a road to be driven (i.e. route setting) is set among roads adjacent to the point of interest, and information for guiding the selection of the charging limit amount based on the first table information.

The vehicle stores 203 information of the charging limit amount, the road position in the route, and the point of interest, inputted when the point of interest, the position of the road in the route, and the charging limit of the battery are selected 202 through the input 141.

For example, when the point of interest is selected through the input, the vehicle identifies and displays the position of the road adjacent to the selected point of interest and the inclination of the road based on the map information stored in the storage, and may display the stored first table so that the user can input the charging limit amount. Here, the charging limit amount may be a charging amount charged by regenerative braking when moving to a predetermined distance from the point of interest.

The first table may be a table in which information about a charging amount that may be charged by regenerative braking for each inclination of a road is stored.

When the charging limit amount is selected through the input, the vehicle stores the selected charging limit amount, the point of interest, the route starting from the point of interest, and the position of the road.

As another example, the vehicle, when a point of interest is selected through the input, may identify the position and inclination of the road adjacent to the selected point of interest based on the map information stored in the storage, may identify the charging amount by regenerative braking corresponding to the identified position and inclination of the road based on the first table, and may automatically display the identified charging amount by the regenerative braking.

The vehicle may also receive information about the position and inclination of the road adjacent to the point of interest from the server.

As another example, when the point of interest and the charging limit amount are selected, the vehicle may store the selected point of interest and the charging limit amount together. In this case, the user may select an automatically displayed charging limit amount, but may also select a charging limit amount that is different from the displayed charging limit amount by referring to the automatically displayed charging limit amount.

As another example, when the point of interest is selected through the input, the vehicle may identify the inclination of the road adjacent to the selected point of interest, may identify the charging limit amount corresponding to the identified inclination, and may store the identified charging limit amount together with the selected point of interest.

When a plurality of points of interest and a charging limit amount at each point of interest are input by the user, the vehicle may store charging limit amounts corresponding to the plurality of points of interest, respectively.

The vehicle, when the manual mode is selected 204, determines whether the vehicle stops to charge the battery.

That is, the vehicle may determine whether the charging of the battery is performed 205, by determining whether the external power is applied to the battery.

The vehicle, when performing the battery charging, identifies 206 the current position, controls 208 the charging of the battery based on the stored charging limit amount if the identified current position is a stored point of interest 207, and controls 209 the charging of the battery based on the reference charging limit amount if the identified current position is not the point of interest.

The vehicle, when the identified current position is determined to be the charging station of the point of interest, may identify the route from the position of the current charging station to the destination, and the vehicle, when the vehicle determines that the identified route is a pre-stored route, may identify the charging limit amount matched with the information of the current charging station.

The vehicle may identify and displays roads adjacent to the charging station when the determined current position is determined to be the charging station of the point of interest, may determine whether the position of the selected road is a position of a pre-stored road when the one road is selected by the driver among the displayed roads, and may identify the charging limit amount matched with the information of the current charging station when it is determined that the position of the selected road is the position of the pre-stored road.

The vehicle identifies the charging allowance amount corresponding to the stored charging limit amount when the identified current position is a stored point of interest, identifies the charge level of the battery while charging the battery, and stops the charging of the battery when the identified charging amount of the battery is identified charging allowance amount.

For example, if the stored charging limit amount is 3%, the charging allowance amount of the battery may be 97%. At this time, the vehicle stops the charging of the battery when the battery charging amount reaches 97%.

The vehicle identifies the reference charging limit amount when the identified current position is not the point of interest, identifies the charging allowance amount corresponding to the identified reference charging limit amount, identifies the chargint amount of the battery while charging the battery, and stops the charging of the battery when the identified charging amount of the battery is identified charging allowance amount.

For example, if the stored charging limit amount is 15%, the charging allowance amount of the battery may be 85%. At this time, the vehicle stops the charging of the battery when the battery charging amount reaches 85%.

If the vehicle is to be driving on a route other than the point of interest or a pre-stored route, or if the vehicle is to be driven on a road other than the pre-stored road, the vehicle may also identify the standard charging limit amount.

In addition, the vehicle may control the charging of the battery based on the reference charging limit amount when it is determined by the user that the point of interest and the charging limit amount are not set and stored. The vehicle may control the charging of the battery based on the reference charging limit amount, when it is determined that the point of interest not set and stored.

When it is determined that the point of interest has not been selected, the vehicle may control the charging of the battery with the charging amount of 100%.

FIG. 6 is a control flowchart of the automatic mode of the vehicle in some forms of the present disclosure.

When the automatic mode is selected and determined 211 to be a charging station, the vehicle identifies the current position (i.e. charging station), searches for a route from the current position to the destination based on the identified current position information and the destination information, and identifies the information of the road in the searched route based on at least one of the navigation information and the ADAS map information.

The determining of the charging station may include determining whether external power is applied to the vehicle. In addition, The determining of the charging station may include determining whether the current position is a charging station based on the navigation information.

The vehicle identifies the altitude of the charging station based on the identified road information, identifies the link of the road first adjacent to the charging station among the roads between the charging station and the destination, and identifies the altitude of the identified link of the road. The vehicle identifies 212 a distance corresponding to the altitude difference between the altitude of the charging station and the identified road link.

The vehicle compares the determined distance with the preset distance, and sets the charging amount by regenerative braking to 0% when the determined distance is less than or equal to the preset distance, and charges 214 the battery based on the set charging amount by regenerative braking.

At this time, the battery charging amount of the vehicle may be 100%.

That is, the vehicle may compare the identified distance with the preset distance, and may not perform the charging limit control of the battery when the determined distance is less than or equal to the preset distance.

Here, the charging amount by the regenerative braking may be a charging amount that can be charged to the regenerative braking when driving from the charging station to a certain distance (end point of the first link).

When the identified distance is less than or equal to the preset distance, it means that the regenerative braking is not performed when the vehicle is driven from the charging station to just before the link of the next road (i.e. just before the link of the second road).

In addition, when the identified distance is less than or equal to the preset distance, it may mean that the regenerative braking is not performed when the vehicle is driven by the reference distance from the charging station.

The vehicle compares the identified distance with the preset distance and identifies the second table pre-stored in the storage when the identified distance exceeds the preset distance.

Here, the second table has information on the charging amount by regenerative braking corresponding to the type of the road, the driving speed, and the inclination of the road.

The vehicle acquires 215 the charging amount charging amount by regenerative braking based on the information of the road in the searched route from the charging station to the destination and the second table, identifies the charging allowance corresponding to the charging amount acquired by the regenerative braking, and controls 216 the charging of the battery based on the identified charging allowance amount.

The information of the road in the searched route may include information on the type of road, the inclination of the road, the speed limit of the road, and the traffic information. The information of the road in the searched route may further include traffic information from the current position to the destination through the communication unit.

That is, the vehicle identifies the charging amount of the battery while when performing the charging of the battery, and stops charging the battery when the identified charging amount of the battery is identified charging allowance amount.

This will be described with reference to FIG. 9.

If the average inclination of 4% and the downhill distance of 5 km in the second table are driven only by regenerative braking of 80 KPH, it is assumed that the regenerative braking amount is stored as 1%, and if the average inclination of 8% and the downhill distance of 5 km are driven only by regenerative braking of 80 KPH, it is assumed that the regenerative braking amount is stored as 2%.

Figure 9:
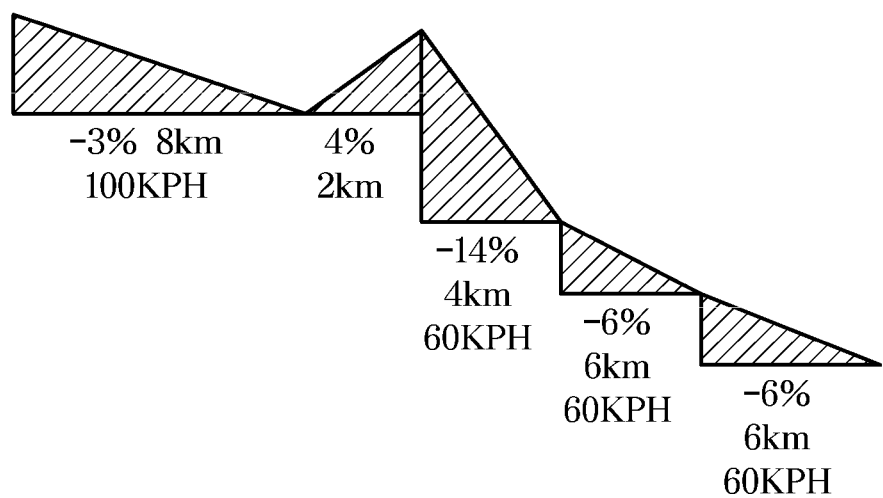

As shown in FIG. 9, if the distance of the first road link that is the first link adjacent to the charging station is 2 km, the average inclination is −4%, the distance on the second road link is 4 km, the average inclination is −8%, the distance on the third road link is 4 km and the average inclination is −4%, the charging amount by regenerative braking is as follows.

Charging amount by regenerative braking=(1%/5 km*2 km)+(2%/5 km*4 km)+(1%/5 km*4 km)=0.4%+1.6%+0.8%=2.8%

The vehicle may acquire the charging amount of 2.8% acquired by the regenerative braking and acquire the charge allowance amount (100% −2.8%) based on the acquired charging amount by the regenerative braking.

In this case, since the output energy and the braking energy are not known, the charging amount by regenerative braking is acquired by considering only the potential energy.

The vehicle acquires 217 the information of a road, a driving speed, and a driving pattern of a user while performing the driving. At this time, the vehicle may acquire the information of the road, the driving speed and the driving pattern of the user for each link of the road.

Here, the link of the road may be classified in response to the change of the inclination of the road. That is, when the inclination of the road is changed, it may be recognized as a link of the next road from the point where the inclination is changed.

In addition, the links of the road may be divided by reference distance (for example, 5 km).

The information of the road identified here is information stored in the second table, and may include the type of road and the inclination of the road.

The vehicle may identify the type of the road and the inclination of the road based on at least one of the current position information, the navigation information, and the ADAS map information received from the position receiver.

The vehicle may identify the inclination of the road among the information on the road based on the detection information detected by the inclination detector 163.

The vehicle may identify the driving speed based on the detection information detected by the speed detector 164.

The vehicle, when acquiring the information of the road, the driving speed and the driving pattern of the user for each link of the road, acquires the charge of the battery charged by regenerative braking and stores 218 the acquired charging amount of the battery as the charge by regenerative braking.

The acquiring of the driving pattern of the user may include acquiring pressure information of the accelerator pedal or the brake pedal from the first and second detectors 161 and 162 when the accelerator pedal is pressed by the user while driving or when the brake pedal is pressed.

That is, the driving pattern of the user may include the pressure magnitude and the number of presses of the brake pedal, the pressure magnitude and the number of presses of the accelerator pedal, and may include a driving speed.

The vehicle stores information on the type of road, the driving speed, the inclination of the road, and the charging amount by regenerative braking in a second table. That is, the vehicle updates the second table.

More specifically, the vehicle identifies the information and the driving speed of the road that has acquired the charging amount by regenerative braking for each link of the road, and identifies the group having the identified road information and the driving speed among the groups of the second table, and stores the acquired charging amount in the identified group.

As the driving history increases, the information of the second table stored in the storage may be continuously updated.

In addition, the vehicle may store the charging amount by regenerative braking in the identified group, but may accumulate and store the charging amount by the regenerative braking previously acquired, may acquire the average charging amount of the charging amounts by the regenerative braking stored in the identified group, and may store the acquired average charging amount as a representative charging amount of the group. In this case, the representative charging amount may be a cell value of the second table.

The vehicle may also delete the oldest charging amount among the charging amounts of the regenerative braking of each group of the second table, and store the charging amount by newly acquired regenerative braking.

As such, the vehicle may acquire the charging amount by regenerative braking, partially reflecting the driving pattern of the user.

The vehicle may acquire the charging amount by regenerative braking using the second table partially reflecting the driving pattern of the user. This will be described with reference to FIG. 10.

If the average inclination is 4%, the downhill distance is 5 km and the driving speed is 100 KPH, it is assumed that the charging amount by regenerative braking is stored as 0.7% (reflecting user's driving pattern), and if the average inclination is 4%, the uphill distance is 5 km and the driving speed is 100 KPH, it is assumed that the charging amount by regenerative braking is stored as −1% (reflecting user's driving pattern), and if the average inclination is 8%, the downhill distance is 5 km and the driving speed is 100 KPH, it is assumed that the charging amount by regenerative braking is stored as 2% (basic information not reflected in the user's driving pattern) (See, FIG. 3a).

When the distance of the first road link adjacent to the charging station is 8 km, an average inclination is −4% and vehicle drives at a driving speed of 100 kph, when the distance of the second road link is 2 km, an average inclination is −4% and vehicle drives at a driving speed of 30 kph, and when the distance of the third road link is 4 km, an average inclination is −8% and vehicle drives at a driving speed of 30 kph, the charging amount by regenerative braking is as follows.

Charging amount by regenerative braking=(0.7%/5 km*8 km)+(−1%/5 km*4 km)+(2%/5 km*4 km)=1.12%−0.4%+1.6%=2.32%

The charging amount by regenerative braking is as follows.

The vehicle may acquire 2.32% of the charging amount by the regenerative braking acquired, and acquire a charging allowance amount (100%-2.32%) based on the acquired charging amount by the regenerative braking.

While performing the above process, the vehicle may set values of all cells of the second table for each type of road.

Accordingly, when the vehicle obtains the charging amount by regenerative braking, the vehicle may acquire the charging amount by regenerative braking in which all of the driving patterns of the user are reflected.

The vehicle may acquire the charging amount by regenerative braking using the second table in which all of the driving patterns of the user are reflected. This will be described with reference to FIG. 11.

If the average inclination is 3%, the downhill distance is 5 km and the driving speed is 100 KPH, it is assumed that the charging amount by regenerative braking is stored as 0.3%, and if the average inclination is 4%, the uphill distance is 5 km and the driving speed is 100 KPH, it is assumed that the charging amount by regenerative braking is stored as −1%, and if the average inclination is 14%, the downhill distance is 5 km and the driving speed is 60 KPH, it is assumed that the charging amount by regenerative braking is stored as 1.7%, and if the average inclination is 6%, the downhill distance is 5 km and the driving speed is 80 KPH, it is assumed that the charging amount by regenerative braking is stored as 1.5% (See, FIG. 6).

Charging amount by regenerative braking=(0.3%/5 km*8 km)+(−1%/5 km*2 km)+(2.7%/5 km*4 km)+(1.7%/5 km*6 km)+(1.5%/5 km*6 km)=0.48%−0.4%+2.16%+2.04%+1.8%=6.08%

The vehicle may acquire 6.08% of the acquired charging amount by the regenerative braking, and may obtain a charge allowance amount (100%-6.08%) based on the acquired charging amount of the regenerative braking.

The vehicle, when preparing to charge at the charging station, may identify the points at which downhill road driving ends, based on the information of the road from the charging station to the destination, may obtain the charging amount by regenerative braking when driving to the points identified at the charging station, respectively, and may control the charging of the battery based on the maximum value of the acquired charging amount by the regenerative braking.

Figure 10:
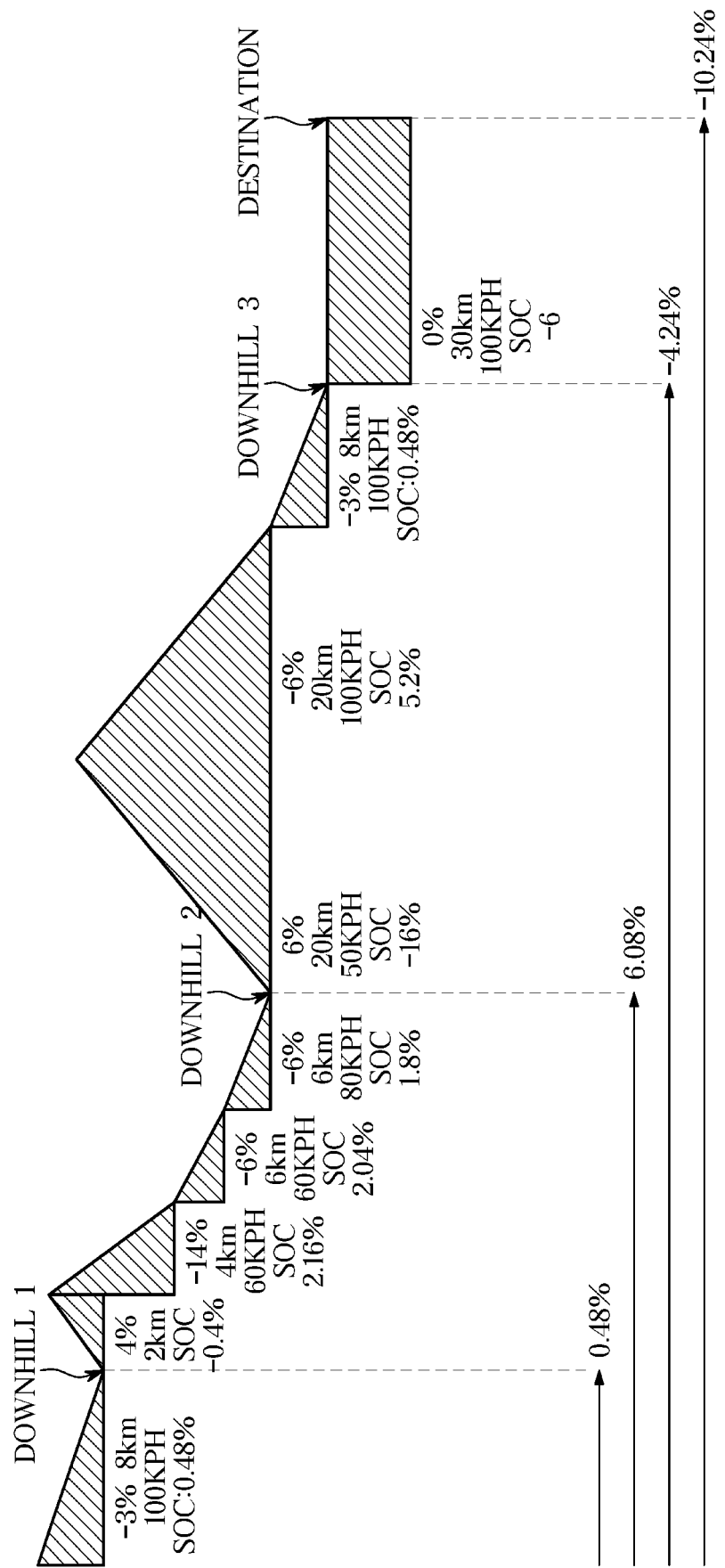

This will be described with reference to FIG. 10.

The vehicle identifies the points of the downhill connected to the uphill among the points where the downhill road driving ends based on the information of the road from the charging station to the destination, acquires the charging amount by regenerative braking when driving to the identified downhill 1, 2 and 3, respectively, and identifies the maximum value of the acquired charging amount by regenerative braking.

When the charging amount by regenerative braking in downhill 1 was 0.48%, the charging amount by regenerative braking in downhill 2 was 6.08%, and the charging amount by regenerative braking in downhill 3 was −4.24, the vehicle sets 6.08% of the maximum amount by regenerative braking to the charging amount by regenerative braking, and controls the charging of the battery based on the set charging amount by the regenerative braking.

Meanwhile, some forms of the present disclosure may be embodied in the form of a recording medium storing instructions executable by a computer. The instructions may be stored in the form of program code and, when executed by a processor, may generate a program module to perform the operations of some forms of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

1: vehicle
140: terminal
151: battery
152: power converter
153: motor
161: first detector
162: second detector
163: inclination detector

164: speed detector
165: position receiver
170: controller
171: storage

What is claimed is:

1. A vehicle comprising:
a battery;
a motor configured to:
  generate a driving force by using an electric power charged in the battery;
  perform a regenerative braking; and
  charge the battery through the regenerative braking;
a storage storing road information regarding a road inclination of each road position, and a table regarding an expected amount of charge to be charged by the regenerative braking;
a position receiver configured to receive current position information;
an input configured to receive destination information and a user input; and
a controller configured to:
  search for a route from a charging station to the destination based on position information of the charging station and position information of the destination during a preparation of charging at the charging station;
  identify the road inclination in the route based on the stored road information;
  when no driving pattern of a user is stored in the storage, obtain an expected amount of charge to be charged by regenerative braking based on potential energy corresponding to the identified road inclination in the route;
  when a driving pattern of the user is stored in the storage, identify a road type and a driving speed in the route based on the stored road information, obtain the expected amount of charge to be charged by regenerative braking based on the identified road type, the identified driving speed, the identified road inclination in the route, and output energy and braking energy corresponding to the driving pattern of the user from the table, wherein the driving pattern of the user includes information on output energy and braking energy corresponding to a road type, a driving speed, and the road inclination and wherein the output energy is energy output through the motor by pressurization an accelerator pedal and the braking energy is energy consumed through a braking device by pressurization of a brake pedal; and
  control a charging of the battery based on the expected amount of charge to be charged by regenerative braking in response to whether the driving pattern of the user is stored in the storage.

2. The vehicle of claim 1, wherein the storage is configured to store a table for each road type.

3. The vehicle of claim 1, wherein the road information also includes a driving speed limit of each road position.

4. The vehicle of claim 1, wherein the vehicle further comprises:
an inclination detector configured to detect the road inclination; and
a speed detector configured to detect a driving speed,
wherein the controller is configured to:
  identify the charging amount of the battery that is generated when performing the regenerative braking during a driving in an automatic mode; and
  store the identified charging amount of the battery in a cell of a table in which the road inclination detected by the inclination detector and the driving speed detected by the speed detector among the stored table are matched, wherein the identified charging amount of the battery is the expected amount of charge to be charged by regenerative braking.

5. The vehicle of claim 1, wherein the vehicle further comprises:
a speed detector configured to detect a driving speed,
wherein the controller is configured to:
  identify the road inclination corresponding to the current position information based on the road information while driving in an automatic mode;
  identify the charging amount of the battery that is generated when performing the regenerative braking; and
  store the identified charging amount in a portion of a table in which the identified road inclination and the detected driving speed among the stored table are matched, wherein the identified charging amount of the battery is the expected amount of charge to be charged by the regenerative braking.

6. The vehicle of claim 5, wherein the vehicle further comprises:
a first pressure sensor configured to detect a first pressure applied to the accelerator pedal; and
a second pressure sensor configured to detect a second pressure applied to the brake pedal,
wherein the controller is configured to acquire the driving pattern of the user for each road inclination based on the driving speed detected by the speed detector, the first pressure detected by the first pressure sensor, and the second pressure detected by the second pressure sensor when performing the regenerative braking.

7. The vehicle of claim 1, wherein, when a point of interest, a position of the road adjacent to the point of interest, and a charging limit amount are received through the input during a manual mode, the storage stores the received point of interest, the position of the road adjacent to the point of interest, and the charging limit amount.

8. The vehicle of claim 7, wherein, when the point of interest and the position of the road adjacent to the point of interest are received through the input during the manual mode, the controller is configured to:
  identify the road inclination adjacent to the point of interest based on the road information;
  identify the expected amount of charge to be charged by the regenerative braking corresponding to the identified road inclination; and
  display the expected amount of charge as a recommended charging limit amount.

9. The vehicle of claim 7, wherein, when the charging station performs the charging of the battery, the controller is configured to:
  control the charging of the battery based on the stored charging limit amount when it is determined that the charging station is the point of interest; and
  control the charging of the battery based on a reference charging limit amount when it is determined that the charging station is not the point of interest.

10. The vehicle of claim 1, wherein the controller is configured to:
  identify a road altitude adjacent to the charging station; and
  control a charging limit of the battery not to be performed when a distance corresponding to a difference between an altitude of the charging station and the identified road altitude is less than or equal to a predetermined distance.

11. A method for charging a battery of a vehicle that includes the battery and a motor configured to charge the battery through regenerative braking, the method comprising:
   identifying destination information input during a charging preparation at a charging station;
   searching for a route from the charging station to the destination based on position information of the charging station and position information of the destination;
   identifying a road inclination in the route based on road information stored at the vehicle:
   when no driving pattern of a user is stored at the vehicle, obtaining an expected amount of charge to be charged by regenerative braking based on potential energy corresponding to the identified road inclination in the route;
   when a driving pattern of the user is stored at the vehicle, identifying a road type and a driving speed in the route based on the stored road information, and obtaining the expected amount of charge to be charged by regenerative braking based on the identified road type, the identified driving speed, the identified road inclination in the route, and output energy and braking energy corresponding to the driving pattern of the user, wherein the driving pattern of the user includes information on output energy and braking energy corresponding to a road type, a driving speed, and the road inclination and wherein the output energy is energy output through the motor by pressurization an accelerator pedal and the braking energy is energy consumed through a braking device by pressurization of a brake pedal; and
   controlling a charging of the battery based on the expected amount of charge to be charged by regenerative braking in response to whether the driving pattern of the user is stored at the vehicle.

12. The method of claim 11, wherein, when the driving pattern of the user is stored at the vehicle, obtaining the expected amount of charge to be charged by regenerative braking comprises using a table in which information of the expected amount of charge corresponding to the road type, the driving speed, the road inclination, and output energy and braking energy corresponding to the driving pattern of the user is stored.

13. The method of claim 12, wherein the method further comprises:
   determining that the regenerative braking is performed;
   identifying the charging amount of the regenerative braking;
   detecting the road inclination;
   detecting a driving speed; and
   storing the charging amount of the battery in a cell in which the detected road inclination and the detected driving speed among the table are matched.

14. The method of claim 13, wherein the method further comprises:
   detecting a first pressure applied to the accelerator pedal when the regenerative braking is performed;
   detecting a second pressure applied to the brake pedal; and
   acquiring and storing the driving pattern of the user for each road inclination based on the first pressure, the second pressure, and the detected driving speed.

15. The method of claim 11, wherein the method further comprises:
   receiving a point of interest, a road position adjacent to the point of interest and a charging limit amount; and
   storing the point of interest, the road position and the charging limit amount as information to be used in a manual mode.

16. The method of claim 15, wherein, when the charging station performs the charging of the battery, the method further comprises:
   determining whether the charging station is the point of interest;
   when it is determined that the charging station is the point of interest, controlling the charging of the battery based on the stored charging limit amount; and
   when it is determined that the charging station is not the point of interest, controlling the charging of the battery based on a reference charging limit amount.

17. The method of claim 15, wherein the method further comprises:
   receiving the point of interest and the road position adjacent to the point of interest;
   identifying the road inclination corresponding to the received road position; and
   storing the charging amount of the regenerative braking corresponding to the identified road inclination and the road position.

18. The method of claim 11, wherein the method further comprises:
   identifying a road altitude adjacent to the charging station; and
   controlling a charging limit of the battery not to be performed when a distance corresponding to a difference between an altitude of the charging station and the identified road altitude is less than or equal to a predetermined distance.

19. The method of claim 11, wherein identifying the destination information, searching for the route, identifying the road inclination, and controlling the charging of the battery are performed by a controller of the vehicle.

20. A vehicle comprising:
   a battery;
   a motor configured to generate a driving force by using an electric power charged in the battery, perform a regenerative braking, and charge the battery through the regenerative braking;
   an accelerator pedal;
   a brake pedal;
   a first pressure sensor configured to detect a first pressure applied to the accelerator pedal;
   a second pressure sensor configured to detect a second pressure applied to the brake pedal;
   a storage storing road information regarding a road inclination of each road position, and a table regarding an expected amount of charge to be charged by the regenerative braking;
   a position receiver configured to receive current position information;
   an input configured to receive destination information and a user input;
   an inclination detector;
   a speed detector configured to detect a driving speed of the vehicle; and
   a controller configured to:
      search for a route from a charging station to the destination based on position information of the charging station and position information of the destination during a preparation of charging at the charging station;

identify the road inclination in the route based on the stored road information;

when no driving pattern of a user is stored in the storage, obtain an expected amount of charge to be charged by regenerative braking based on potential energy corresponding to the identified road inclination in the route;

when a driving pattern of the user is stored in the storage, identify a road type and a driving speed in the route based on the stored road information, obtain the expected amount of charge to be charged by regenerative braking based on the identified road type, the identified driving speed, the identified road inclination in the route, and output energy and braking energy corresponding to the driving pattern of the user from the table, wherein the driving pattern of the user includes information on output energy and braking energy corresponding to a road type, a driving speed, and the road inclination and wherein the output energy is energy output through the motor by pressurization the accelerator pedal and the braking energy is energy consumed through a braking device by pressurization of the brake pedal; and control a charging of the battery based on the expected amount of charge to be charged by regenerative braking in response to whether the driving pattern of the user is stored in the storage.

\* \* \* \* \*